Patented July 18, 1950

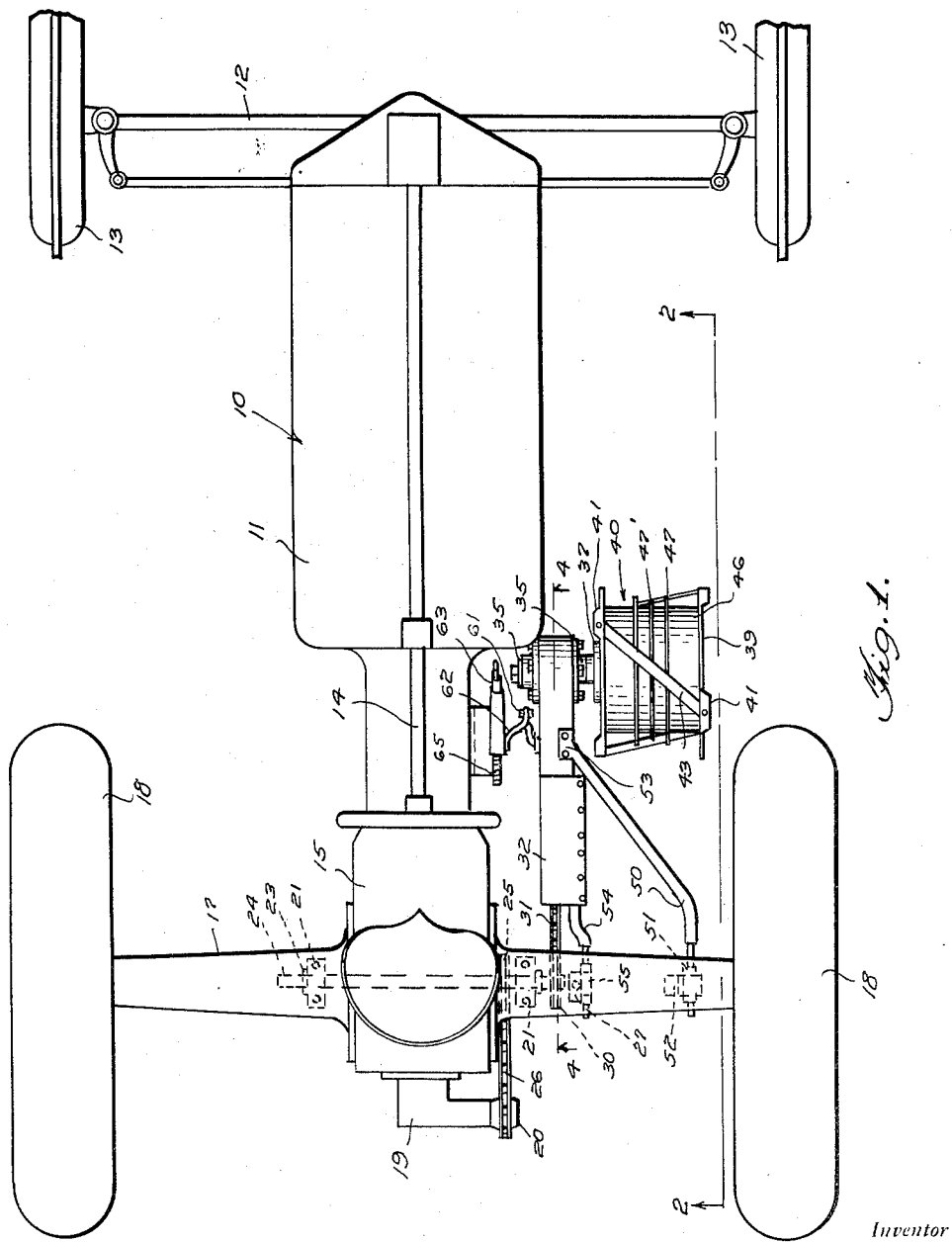

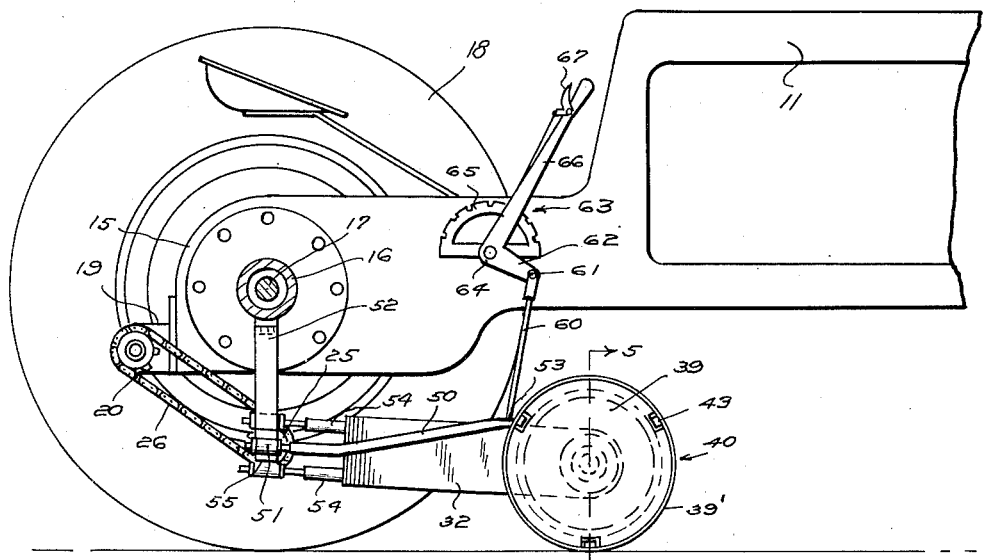
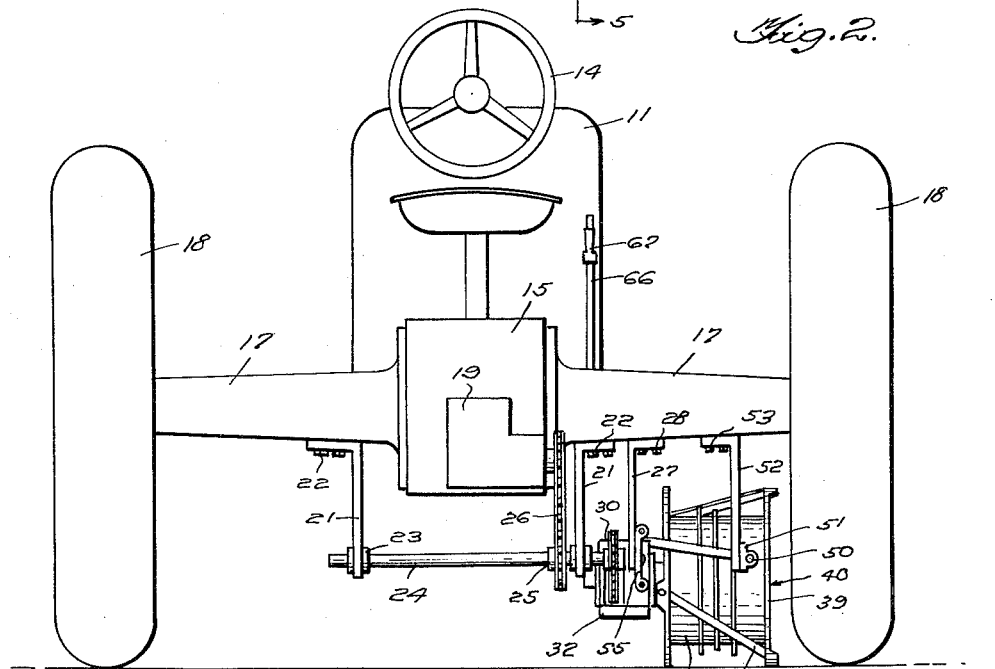
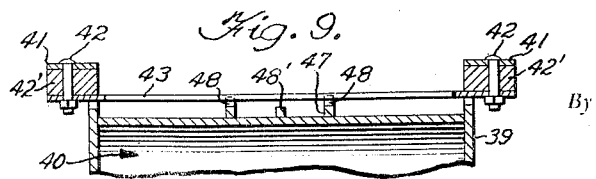

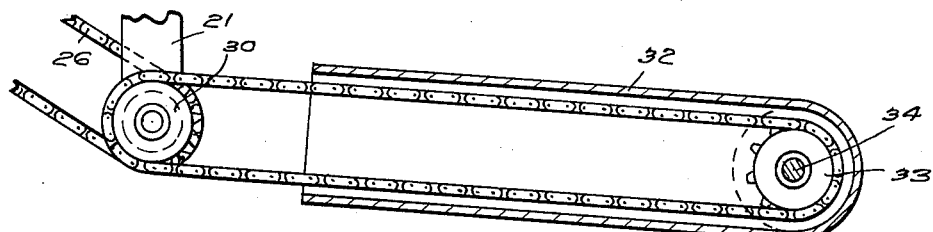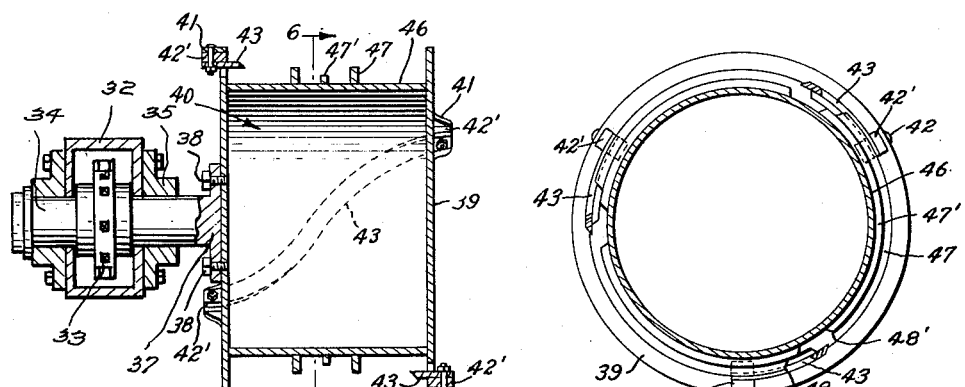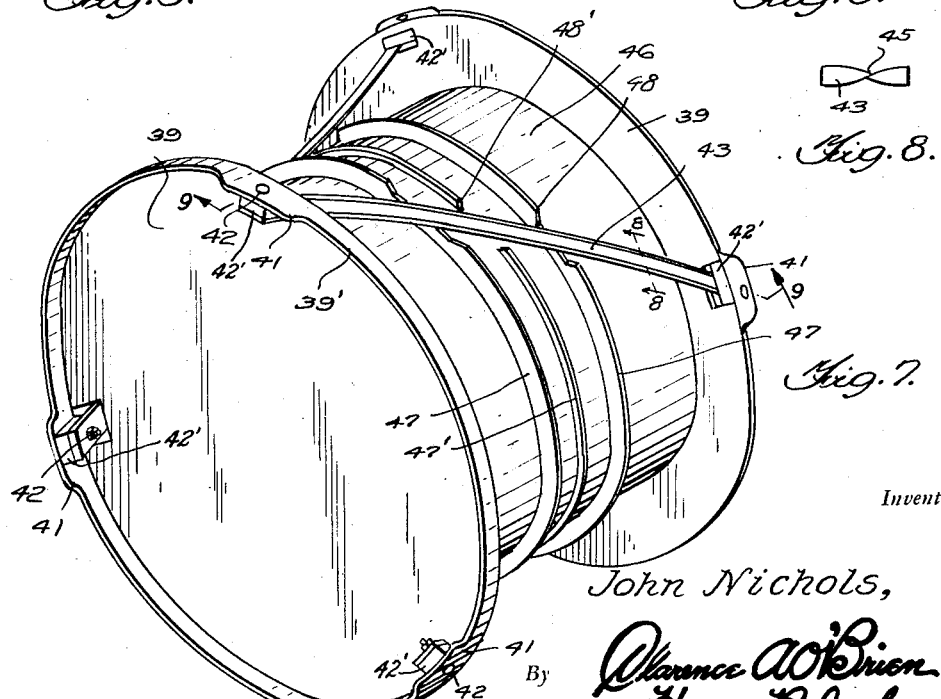

2,515,660

UNITED STATES PATENT OFFICE 2,515,660

DEVICE FOR TOPPING BEETS

John Nichols, Outlook, Wash.

Application November 9, 1945, Serial No. 627,713

2 Claims. (Cl. 56—26)

This invention relates to device for topping beets, and more particularly to such a device adapted to be mechanically driven as by a tractor or similar farm implement.

A primary object of the invention resides in an improved means for topping beets while still in the ground, and prior to the digging of same.

An additional object of the invention resides in the provision of an improved appliance, adapted to be associated with a tractor or the like, and including a rotating drum carrying knife blades, whereby the beets may be evenly and accurately topped prior to the digging, thus avoiding the necessity of the use of manual labor for such purpose.

Still another object of the invention resides in the provision of such a device wherein the drum will readily and automatically adjust itself to ground contour, in such manner that the beets will be relatively evenly topped, and digging into the ground will be avoided.

A still further object of the invention is the provision of a beet topper of the drum type, characterized by spirally positioned knife blades so positioned that the centers of the blades are closer to the drum than their extremities, the drum being provided with guides, whereby the topping drum is adapted to ride over relatively large beets, to top the same without damaging the beet itself.

A still further object of the invention is the provision of such a device which will be sturdy and durable in construction, reliable and efficient in operation, and relatively simple and inexpensive to manufacture and assemble.

Other objects reside in the combinations of elements, arrangements of parts, and features in construction, all this will be more fully pointed out hereinafter and shown in the accompanying drawings wherein there is disclosed a preferred embodiment of this inventive concept.

In the drawings:

Figure 1 is a top plan view of one form of device embodying features of the instant invention shown as applied to a conventional tractor, certain concealed portions thereof being indicated in dotted lines.

Figure 2 is a sectional view taken substantially along the line 2—2 of Figure 1, as viewed in the direction indicated by the arrows.

Figure 3 is a rear elevational view of the device disclosed in Figure 1.

Figure 4 is an enlarged sectional view taken substantially along the line 4—4 of Figure 1 as viewed in the direction indicated by the arrows.

Figure 5 is an enlarged sectional view taken substantially along the line 5—5 of Figure 2, as viewed in the direction indicated by the arrows.

Figure 6 is a sectional view taken substantially along the line 6—6 of Figure 5 as viewed in the direction indicated by the arrows.

Figure 7 is an enlarged perspective view of the cutting drum per se.

Figure 8 is a sectional view taken substantially along the line 8—8 of Figure 7; and Figure 9 is a fragmentary vertical sectional view through the drum taken on the line 9—9 of Figure 7 and illustrating the manner of adjusting the depth of cut of the blade.

Similar reference characters refer to similar parts throughout the several views in the drawings.

Having reference now to the drawings, there is generally indicated at 10 a conventional farm tractor of any desired type, including a frame 11, a front axle 12 provided with wheels 13, steering mechanism 14, a transmission 15 driving a rear axle 16 through a rear axle housing 17, which axle 16 in turn drives rear wheels 18. A conventional power take-off 19 extends rearwardly from the transmission 15, and terminates in a rotatable sprocket 20.

Depending brackets 21, suitably secured as by bolts 22 to the underside axle housing 17, on opposite sides of transmission 15, are provided at their lower extremities with aligned apertures, within which are mounted journals 23 which rotatably support a drive shaft 24 which has keyed or otherwise suitably secured thereto a sprocket 25. A chain 26 connects the sprockets 20 and 25 in such manner that the shaft 24 is rotated by the power take-off 19.

The outer extremity of the shaft 24 is journaled for rotation in a suitable bearing in a bracket 27, secured as by bolts 28 to the underside of the rear axle housing 17, outwardly of the adjacent bracket 21. A sprocket 30 is mounted on the shaft 24 between the supporting brackets 27 and 21, and engages a chain 31 which extends within a housing 32, to a sprocket 33 mounted on the shaft 34. As best shown in Figure 5, the shaft 34 is mounted in suitable bearings 35 secured to the side walls of the casing 32.

The outer extremity of the shaft 34 terminates in a flange 37 to which is secured as by suitable bolts 38 (see Fig. 5) to the side walls 39 of a topping drum generally indicated at 40.

As best shown in Figure 7 the topping drum is comprised of side walls 39, each provided with a peripheral flange 39' provided with projections 41, the projections 41 being positioned at spaced intervals and disaligned on opposite sides of the drum. Extending between the projections 41, and secured thereto as by any desired means as for example cap screws 42, or the like, are a plurality of knife blades 43 provided with oppositely disposed cutting edges 44, and of substantially helical form, in that each is provided with a relatively centrally positioned twist 45, as best shown in Figure 8. The blades are of this configuration in order that the centers of the blades may be located closer to the drum than the ends thereof to facilitate the proper topping of beets. Obviously other forms of knives accomplishing the same function may be employed. If desired the relative positioning of the blades may be adjusted by placing shims under the blades to give the requested depth of cut. This is accomplished, as shown in Figure 9, by placing shims 42' between the projections 41 and the ends of the blades 43, the shims and blades being held in place by the headed bolts or pins 42. The side walls 39 abut opposite sides of a drum-like portion 46, provided with a plurality of guide ridges 47, the outer two of which are relatively higher than the central ridge 47'. Cutaway portions 48 and 48' in guides 47 and 47', respectively permit the passage of the diagonally disposed blades 43 there-across.

From the foregoing it will now be seen that the power take-off drives, through the chains 26 and 31, the drum 40, and consequently rotates the cutting blades 43. The speed of rotation may be suitably adjusted in the conventional manner, but in actual practice it has been found that a speed from fifteen to sixteen times that of the speed of the tractor is to be preferred.

A frame supporting arm 50 is pivotally secured around a pivot 51 to a bracket 52 suitably secured as by bolts 53 or the like to axle housing 17 at a point spaced a substantial distance outwardly from bracket 27. As best shown in Figure 1, the support 50 is angularly disposed inwardly from the bracket 52 and secured in any suitable manner, as by rivets 53, to the housing 32. Additional supports 54 in substantially vertical alignment extend from a point exterior of the housing 32, adjacent bolts 53, through apertures in a pivotally mounted supporting member 55 secured as by a pivot 56 to bracket 27.

Thus it will be seen that the housing, and its associated drum and cutting knives are relatively pivotally mounted with respect to the tractor frame, in such manner that the drum may be moved upwardly or downwardly by irregularities in the ground contour, so as to readily adapt itself to such contours and top a beet, or a row of beets with a maximum efficiency at a desired level relative to the ground.

Means are provided for lifting the drum clear of the ground when desired and take the form of a flexible connection 60 secured at one end to the housing 32, and at the other end, as by means of a pivot 61 to the extending arm 62 of a bell crank lever, generally indicated at 63, pivotally mounted as on a pivot 64 adjacent a detent 65 secured to the tractor frame 11. The other leg of the bell crank member 62 comprises a handle portion 66, provided with a movable pivoted portion 67 adapted to actuate a latch of any desired conventional type to engage with the detent 65. If desired a resilient connection may be provided between the arm 32 and the tractor frame to render the movement of the drum more sensitive.

From the foregoing the operation of the device should now be readily understandable. It will be readily understood that when the beet topper, is driven along a row of beets the drum is free to follow contours of the ground, and automatically raises when a beet is encountered and rides thereover, the relatively rapidly rotating knife blades 43 effectively topping all the beets in the row regardless of the relative height of the portion thereof protruding from the ground. In the case of exceptionally large beets it will be readily apparent that the guides 47 cause the blade to ride up one side of the beet, in the direction of approach, and down the other, thus rendering the cut relatively uniform over the entire upper surface of the beet, completely topping the same. After the topping operation has been completed, it will be obvious the beets may be readily dug in any conventional manner, as with an ordinary root digger.

From the foregoing it will now be seen that there is herein provided an improved beet topper, which accomplishes all the objects of this invention, and others including many advantages of great practical utility and commercial importance. It will also be seen that the topper of the instant invention serves mechanically to top any desired quantity of beets planted in rows, prior to the digging of the same, in a relatively clean, efficient, and economical manner, thus avoiding the loss of time and the waste incident to the hitherto utilized manual methods of beet topping.

Since many embodiments may be made of this inventive concept, and since many modifications may be made in the embodiment hereinbefore shown and described, it is to be understood that all matter herein is to be interpreted merely as illustrative and not in a limiting sense.

What I claim is:

1. In a device for topping beets; a rotatable cutting member comprising a cylindrical body having enlarged annular side flanges, a plurality of laterally spaced annular ridges carried by said cylindrical body and disposed between said side flanges, lateral projections on each of said side flanges, guide notches in said ridges, blades extending diagonally across said cylindrical body and received in said notches, pin means securing the ends of each blade to a pair of opposed lateral projections, and shims interposable between the ends of said blades and said projections and receivable on said pin means to adjust the distance between said blades and said cylindrical body.

2. The combination of claim 1 wherein three ridges are provided, the outer ridges being higher than the intermediate ridge.

JOHN NICHOLS.

REFERENCES CITED

The following references are of record in the file of this patent:

UNITED STATES PATENTS

| Number | Name | Date |
|---|---|---|
| 835,600 | Chambers | Nov. 13, 1906 |
| 1,296,577 | Weber | Mar. 4, 1919 |
| 1,450,872 | Sparks | Apr. 3, 1923 |
| 2,185,833 | Clemson | Jan. 2, 1940 |